United States Patent
Eriksson et al.

(10) Patent No.: US 7,124,060 B1
(45) Date of Patent: Oct. 17, 2006

(54) METHOD FOR ISOLATING A FAULT FROM ERROR MESSAGES

(75) Inventors: Peter Eriksson, Västerås (SE); Magnus Larsson, Linköping (SE)

(73) Assignee: ABB AB, Västerås (SE)

( * ) Notice: Subject to any disclaimer, the term of this patent is extended or adjusted under 35 U.S.C. 154(b) by 695 days.

(21) Appl. No.: 10/129,188

(22) PCT Filed: Nov. 3, 2000

(86) PCT No.: PCT/SE00/02166

§ 371 (c)(1),
(2), (4) Date: Oct. 9, 2002

(87) PCT Pub. No.: WO01/33354

PCT Pub. Date: May 10, 2001

(30) Foreign Application Priority Data

Nov. 3, 1999 (SE) .................................. 9904008

(51) Int. Cl.
*G06F 11/00* (2006.01)
(52) U.S. Cl. .................. 702/185; 702/58; 702/187; 702/183; 714/48; 714/57; 714/25
(58) Field of Classification Search ................ 702/185, 702/58, 59, 122, 125, 176, 177, 183, 182, 702/184, 186, 187, 188; 714/45–49, 57, 714/25, 26, 37, 2
See application file for complete search history.

(56) References Cited

U.S. PATENT DOCUMENTS

| | | | |
|---|---|---|---|
| 4,964,125 A | 10/1990 | Kim .................... | 714/26 |
| 4,996,688 A * | 2/1991 | Byers et al. ............. | 714/45 |
| 5,161,158 A | 11/1992 | Chakravarty et al. ....... | 714/26 |
| 5,429,329 A * | 7/1995 | Wallace et al. ........... | 246/166 |
| 5,513,312 A * | 4/1996 | Loebig .................. | 714/3 |
| 5,845,272 A | 12/1998 | Morjaria et al. .......... | 706/50 |
| 6,212,649 B1 * | 4/2001 | Yalowitz et al. .......... | 714/31 |
| 6,324,659 B1 * | 11/2001 | Pierro ................... | 714/48 |
| 6,338,152 B1 * | 1/2002 | Fera et al. .............. | 714/48 |
| 6,848,104 B1 * | 1/2005 | Van Ee et al. ........... | 719/310 |

OTHER PUBLICATIONS

M. Sampath et al., Diagnosability of Discrete-Event Systems, IEEE Transactions on Automatic Control, vol. 40, No. 9, Sep. 1995, pp. 1555-1575.
W. Scherer et al., A Survey of Expert Systems for Equipment Maintenance and Diagnostics, Knowledge-Based System Diagnosis, Supervision and Control, 1989, pp. 285-301.
S. Tzafestas et al., Modern Approaches to System/Sensor Fault Detection and Diagnosis, Journal A, vol. 31, No. 4, 1990, pp. 42-57, no month.
R. Miller et al., Issues with Exception Handling in Object-Oriented Systems, Proceedings of 11th European Conference on Object-Oriented Programming, Jyväskylä, Finland, Jun. 1997, pp. 85-103.

(Continued)

*Primary Examiner*—Hal Wachsman
(74) *Attorney, Agent, or Firm*—Venable LLP; Eric J. Franklin

(57) ABSTRACT

A method, a use of the method, a system, a use of the system, a computer program code element, and a computer readable medium for automatically isolating primary faults out from a system log including actual error messages in a system controlled by an object oriented program. Messages are isolated through clustering.

14 Claims, 4 Drawing Sheets

OTHER PUBLICATIONS

UML Notation Guide, Version 1.1, Sep. 1, 1997, pp. 1-142.

Tom De Marco, Structured Analysis and System Specification, 1979, no month.

Randall Davis and Waletr Hamscher; Model-based reasoning: Troubleshooting; pp. 3-24; Exploring Artificial Intelligence: Survey Talks from the National Conferences on Artificial Intelligence,, H.E. Strobe (ed.), pp. 297-346 Morgan Kaufmann (1988).

Raymond Reiter; A Theory of Diagnosis from First Principles; pp. 29-48, Artificial Intelligence 32 (1987), pp. 57-95, no month.

Peter Struss and Oskar Dressler; "Physical Negation" Integrating Fault Models into the General Diagnostic Engine; pp. 153-158, Jan. 1992, Readings in model-based diagnosis, m Morgan Kaufmann Publishers Inc.

Lester J. Holtzblatt; Diagnosing Multiple Failures using Knowledge of Component States; pp. 165-169, Proceedings of the 4$^{th}$ IEEE Conference on A1 applications, Mar. 1988, pp. 139-143.

S. Tzafestas and K. Watanabe; Modern Approaches to System/Sensor Fault Detection and Diagnosis; Journal A; 1990; pp. 42-57: vol. 31, n° 4, no month.

Robert Miller and Anand Tripathi, Issues with Exceptional Handling in Object-Oriented Systems, Mehmet Aksit and Satoshi Matsuoka (eds.); ECOOP '97—Object-Oriented Programming; Apr. 1997; pp. 85-103; Lecture Notes in Computer Science.

Meera Sampath et al; Diagnosability of Discrete-Event Systems; IEEE Transactions on Automatic Control: Sep. 1995; pp. 1555-1575; vol. 40, No. 9.

Raymond Rieter; A Theory of Diagnosis from First Principles; Model-Based Diagnosis; Artificial Intelligence 32 (1987), pp. 57-95; Model-Based Diagnosis, Hamscher et al. (eds.), pp. 29-48; Elsevier Science Publishers.

William T. Scherer and Chelsea C. White, III; A Survey of Expert Systems for Equipment Maintenance and Daignostics: Knowledge-Based System Diagnosis, Supervision, and Control; 1989; pp. 285-301; A Division of Plenum Publishing Corporation; New York, New York

* cited by examiner

//<br>
METHOD FOR ISOLATING A FAULT FROM ERROR MESSAGES

CROSS-REFERENCE TO RELATED APPLICATIONS

This application claims priority to Swedish patent application 9904008-1 filed Nov. 3, 1999 and is the national phase under 35 U.S.C. § 371 of PCT/SE00/02166.

TECHNICAL FIELD

The present invention pertains to a method, a use of the method, a system, and a use of the system, a computer program code element, and a computer readable medium for isolating a fault from a plurality of error messages in a system log of a process controlled by an object oriented program.

PRIOR ART

Developing control systems for complex systems is a difficult and increasingly important task. Larger control systems have traditionally been developed using structured analysis and functional decomposition, see for example T. DeMarco. Structured Analysis and System Specification. Prentice-Hall. 1979. When applying traditional programming, it is possible to optimize a programming code with respect to real-time requirements, and it is easier to generate concise error messages since the state of a whole control program is known at each point of time.

Today many large systems are designed using an object oriented approach. This has several advantages over traditional approaches, including better possibility to cope with complexity and to achieve good maintainability and reusability. However, since error messages originating from a certain fault often reflect the control system design and architecture, it can be very difficult for an operator to understand which error message, of a plurality of error messages, is most relevant and closest to the real fault.

One method to use for fault isolation is to compile a database, or use an expert system, see e.g. W. T. Scherer and C. C. White. A survey of expert systems for equipment maintenance and diagnostics. In S. G. Tzafestas, editor, Knowledge-based system diagnosis, supervision and control, pages 285–300. Plenum, New York, 1989, and S. Tzafestas and K. Watanabe. Modern approaches to system/sensor fault detection and diagnosis. Journal A, 31(4):42–57, December 1990. But a highly configurable system has the disadvantage that every installation of the control system needs a new database. Also, when changes are made in the system itself, it can render an extensive database useless.

Another possibility for fault isolation is to use a model that is tailored for fault isolation. Some general examples can be found in W. Hamscher, L. Console, and J. de Kleer. editors. Readings in model-based diagnosis. Morgan Kaufmann Publishers, San Mateo, Calif., 1992, and M. Sampath, R. Sengupta, S. Lafortune. K. Sinnamohideen, and D. Teneketzis. Diagnosability of discrete-event systems. IEEE Transactions on Automatic Control. 40(9):1555–1575, September 1995.

The advantage of using a specialized model is that such a model can contain exactly the information needed for the fault isolation, and the fault isolation procedure can be much simplified. The disadvantage is that this model must be maintained separately. To maintain such a model is not trivial and a great deal of work may be needed to keep the model up to date.

Exception handling mechanisms are intended to help improve error handling in software, to make programs more reliable and robust. They are language constructs that facilitate error handling outside of the conventional program flow and at the appropriate level. The exception constructs might also support a programmer in providing more information to the error handler code than available through the conventional object interface, to facilitate error recovery.

Exception handling mechanisms are in their nature low level constructs, and as such address a fault handling problem from the bottom up. It is known from to note, as pointed out in R. Miller and A. Tripathi "Issues with exception handling in object-oriented systems", in Proceedings of 11th European Conference on Object-Oriented Programming (ECOOP97), Jyväskylä, Finland, June 1997, that the goals of exception handling often stand in direct conflict with the goals of an object oriented architecture, the very same goals of encapsulation and modularity that cause the fault propagation problem addressed in the present invention.

SUMMARY OF THE DESCRIBED INVENTION

The present invention provides a model based method for fault isolation by introducing an extra layer between an operator and/or process control means and actual error messages produced by a control system. This approach can be summarized as having a liberal error message sending policy for individual objects, with a structured signature for the messages, and a clustering method to isolate fault scenarios. A model of the system is then used to isolate the object/objects closest to the fault in each fault scenario. The message(s) closest to the fault and hence most relevant, can then be presented to, for example, an operator, that can take measures to deal with a fault more easily than previously known in accordance with the present invention.

In order to overcome disadvantages and problems related to fault isolation today, for example, for processes involving an industrial robot, the present invention sets forth a method provided for isolating a fault from a plurality of error messages in a system log of a process controlled by an object oriented program.

In an embodiment of the present invention it includes the steps of;

creating a predefined signature for each error message of the plurality of error messages, forming a time period to frame from the plurality of error messages the error messages belonging to a fault scenario of the fault, clustering the error messages that fall within the time period, forming from the signatures of the clustered error messages a base graph, which is a formal representation of the fault scenario, carrying cause-effect relation information of the error messages, analyzing the base graph rules to isolate the fault, and reporting information containing the fault to a control means, which provides measures taking care of the fault.

Each of the signature is brought to contain information on complaint and complainer in an embodiment of the invention.

An explanation model is formed from an underlying assumption of communication between system entities needed to carry out a specific task, which system entities includes objects, packages and threads, and having the signatures defined on the base of the explanation model in an embodiment of the invention.

The mentioned time period starts with the first error message in a fault scenario and ends with a stop message in an embodiment of the invention.

Reported information in accordance with an embodiment of the present invention is containing a reliability estimate of the fault.

In one embodiment of the present invention, in case of an inconclusive base graph, the analyzing step further includes the step of;

extending the base graph with the help of a system model, containing information on the dependency relation between system entities, and analyzing the extended base graph with a set of predetermined explanation rules to isolate the fault.

Another embodiment of the present invention includes that the system model is formed using the "Unified Modeling Language (UML)".

Still another embodiment of the present invention includes the use of a method according to the above in a process involving an industrial robot.

Further, the present invention provides a system for isolating a fault from a plurality of error messages in a system log of a process controlled by an object oriented program.

Each error message of the plurality of error messages includes in a preferred embodiment of the present invention a predefined signature and an interface located between the program and a process control, the interface includes elements for clustering error messages belonging to a fault scenario of the fault, elements for forming from the signatures of the clustered error messages a formal representation, a base graph, of the fault scenario, elements for analyzing the formal representation to isolate the fault, and elements for reporting information containing the fault to the process control, which provides measures taking care of the fault.

Another embodiment of the present invention includes that the signature includes information on complaint, complainer and complainee, and that the signature is formed from an explanation model including an underlying assumption of communication between system entities needed to carry out a specific task, the system entities include objects, packages and threads.

The time period starts with the first error message in the fault scenario and ends with a stop message in one embodiment of the invention.

A still further embodiment provides that the system includes elements for establishing a reliability estimate of the fault and that the fault information contains the estimate.

In case of the base graph being inconclusive the system further includes, in one embodiment of the invention, elements for extending the base graph with the help of a system model, containing information on the dependency relation between system entities, and elements for isolating the fault from the extended graph by using predetermined explanation rules.

The "Unified Modeling Language (UML)" is used to form the system model in a preferred embodiment of the invention.

Yet another embodiment provides the use of the system in accordance with the above described system in a process involving an industrial robot.

A further embodiment of the present invention is set forth by a computer program code element including computer code for enabling a processor to isolate a fault from a plurality of error messages in a system log of a process controlled by an object oriented program.

It enables a processor to carry out the steps of;

forming an interface between the program producing the plurality of error messages and a process control, creating a cluster from said plurality of error messages belonging to a fault scenario of the fault, analyzing the cluster using predefined error message signatures and a predetermined system model to isolate the fault, and reporting information containing the isolated fault to the process control, which provides measures taking care of the fault.

One embodiment provides the code element contained in a computer readable medium.

Another embodiment of the invention provides that the code element is supplied at least in part over a network such as the Internet.

Also set forth through the present invention is a computer readable medium. Whereby it contains a computer program code element including computer code for enabling a processor to isolate a fault from a plurality of error messages in a system log of a process controlled by an object oriented program, by which the processor is enabled to carry out the steps of:

forming an interface between the program producing the plurality of error messages and a process controlling means, creating a cluster from the plurality of error messages belonging to a fault scenario of the fault, analyzing the cluster using predefined error message signatures and a predetermined system model to isolate the fault, and reporting information containing the isolated fault to the process control, which provides measures taking care of the fault.

BRIEF DESCRIPTION OF THE DRAWINGS

For a more complete understanding of the present invention and for further objectives and advantages thereof, reference may now be made to the following description taken in conjunction with the accompanying drawings, in which.

TABLE

Figure 6:
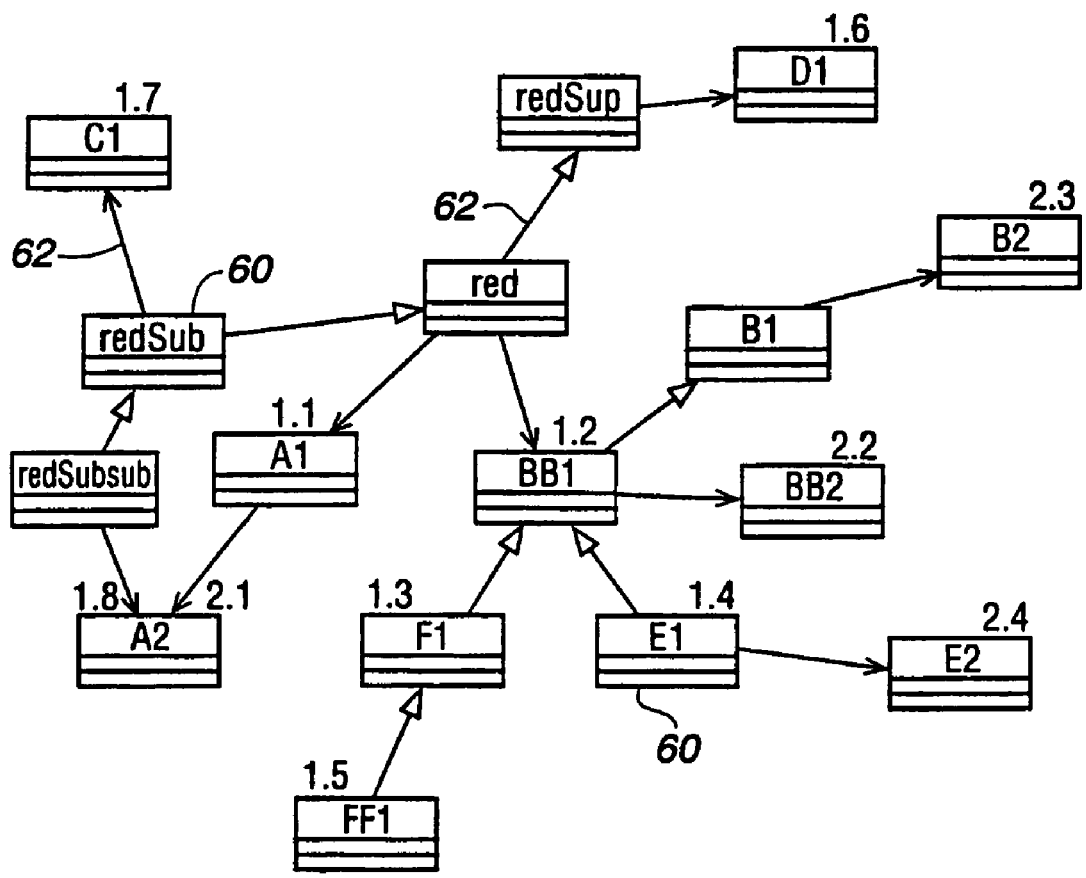
FIG. 6 schematically illustrates a generic example of a UML traversal algorithm.

Table 1 on the last page of the present description illustrates server chains returned by an UML traversal algorithm for the model in accordance with FIG. 6.

DETAILED DESCRIPTION OF PREFERRED EMBODIMENTS

The features of the present invention provide a more abstract view regarding fault isolation then prior art, and addresses the problem, mainly fault propagation, from a top-down perspective. It is not intended to replace low level error handling, but to be used in conjunction with low level error handling in some form. It can, e.g., be a disciplined use of return codes or full-fledged exception handling mechanisms.

In object oriented design, encapsulation and modularity are fundamental and important design goals for reuse, maintenance and complexity reasons. An often conflicting design goal lies in the need to suppress unnecessary, propagating, error messages and eventually give an operator and/or process control means a concise picture of a fault situation, in order to act upon it.

The issue is how a configurable and safety critical control system with an object-oriented architecture handles and isolates run-time faults and alarms, and specifically the problems that arise due to the object oriented structure and complexity of the control system itself.

The control system can be multi-threaded, with several concurrent tasks communicating both asynchronously and synchronously. The objects in the system according to the present invention are both pure software objects as well as objects corresponding to hardware. The invention is concentrated mainly on fault handling for a fully operational system, and will not discuss installation and startup problems.

With the term fault, a run-time change or event is meant here, normally in hardware, that eventually causes the system to abort conventional operation. When a fault occurs during conventional operation, the system often generates a large number of error messages, for example, bursts of errors. Error messages are sent by individual objects to notify an operator or a means for operating when the object has detected an error condition. The individual object does not in general know how close it is to the real fault, or if sufficient reporting is already taking place, and hence whether it should report to the operator or not.

Figure 1:
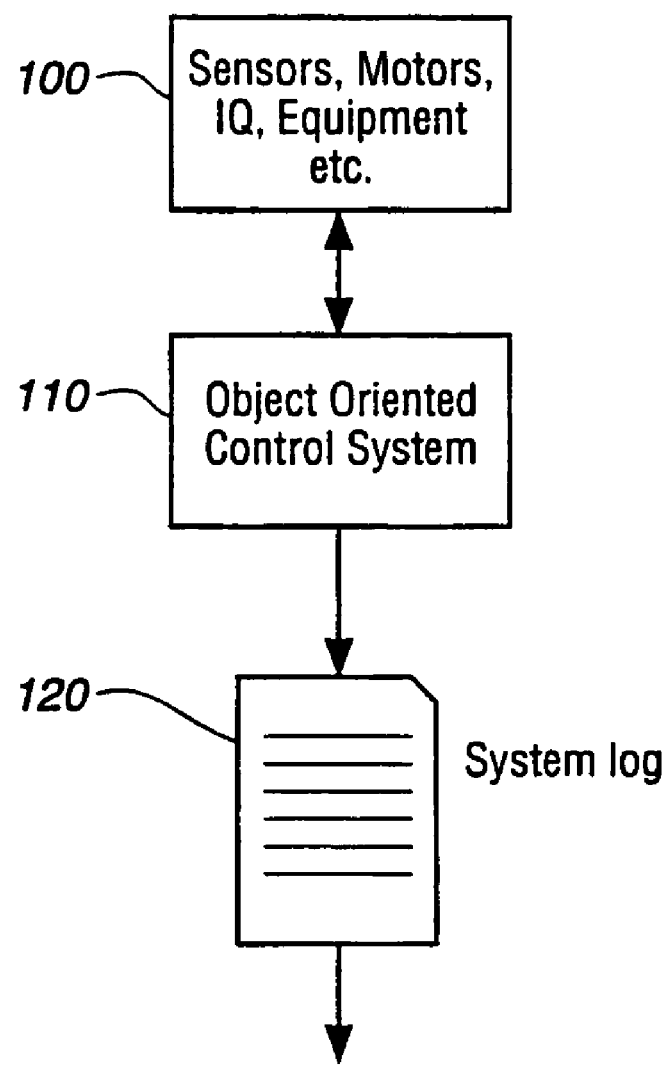
FIG. 1 schematically illustrates a conventional prior art message system with a system log.

FIG. 1 schematically illustrates a conventional prior art message system with a system log where box or block 100 depicts input signals from sensors, motors I/O equipment etc. Reference numeral 110 represent an object oriented control system controlling an arrangement such as an industrial robot and checking for messages in a system log 120 depending on its input signals. If there are messages corresponding to the processing of signals by the control system 110, messages regarding faults or any other message that has to be presented to an operator of the system/arrangement are output as information for maintenance etc. Prior art control systems and system logs are not designed to pinpoint primary faults or to sort them out from among a plurality of messages in order to determine maintenance, repair etc. for an operator of, for example, a complex control system, this is restricted to highly skilled engineers or the like.

When an error condition is encountered, the affected object normally lets the proper interface method return with an error code to the calling object. It might also decide to continue its conventional operation, e.g., in the case of an event driven threads main loop. The returned error code in turn can be regarded as an error condition by the calling object. If deemed appropriate by designers, the object registers an error message to a central log 120. If an error condition is deemed so serious by a detecting object that conventional operation cannot continue, a special asynchronous call is made that performs an emergency stop.

For objects in a program close to each other it is possible to suppress error messages by information passing, but this is not always feasible—it is an explicit aim of object oriented modeling to encapsulate knowledge about the internal state of objects and to achieve independence between groups of collaborating objects (i.e., encapsulation and modularity). Moreover, the control system that is considered here is safety critical. In case of a serious fault, the first priority is to bring the system or arrangement to a safe state. Only then is it possible to start analyzing what may have caused the fault.

A primary concern is a situation where an operational system is normally running without direct supervision. Since the error messages stemming from a certain fault often reflects the control system design and architecture, it can be very difficult for the operator to understand which error message that is most relevant and closest 120 to the real fault.

Figure 2:
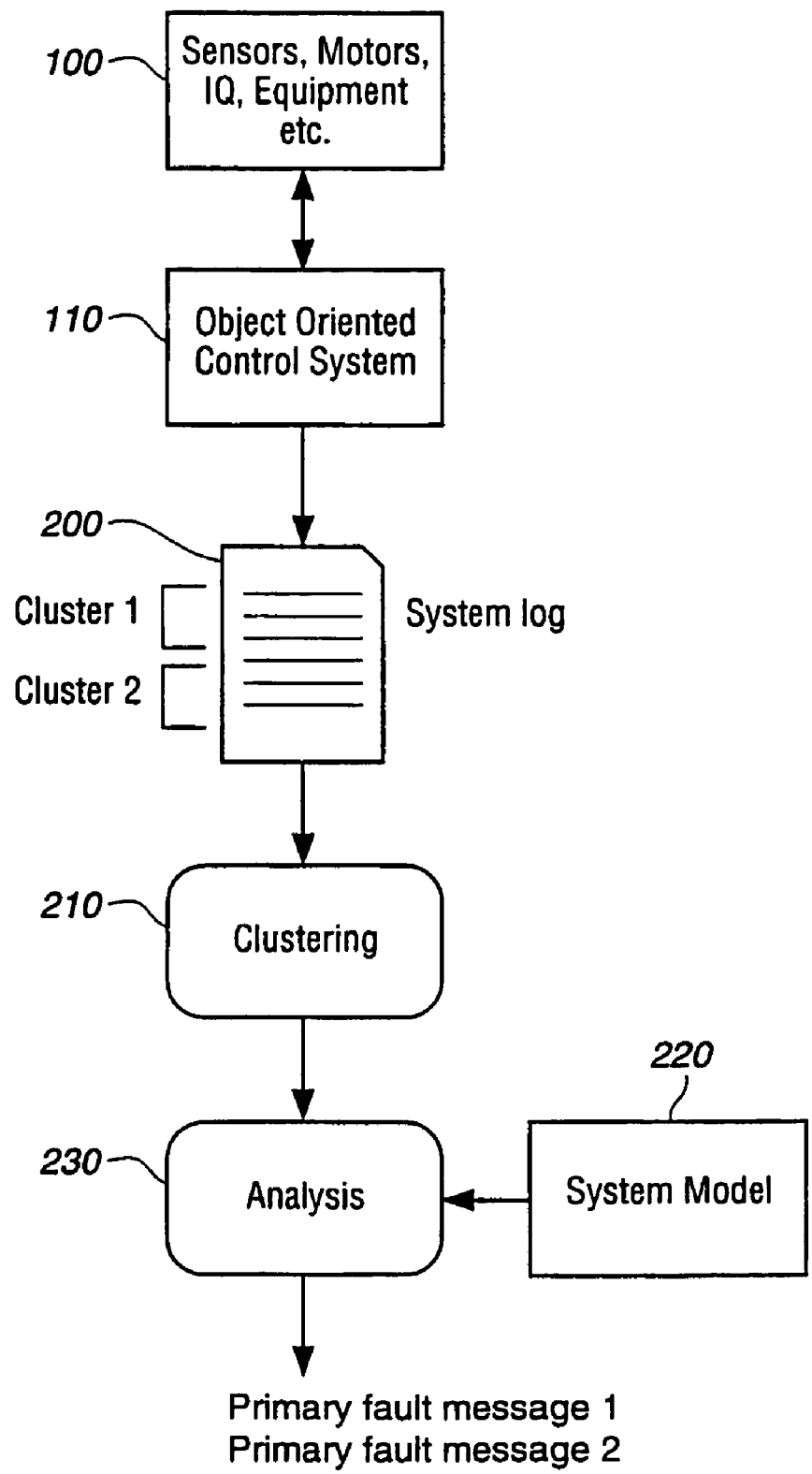
FIG. 2 schematically illustrates a message system for fault isolation in accordance with the present invention.

The present invention, as depicted in FIG. 2, schematically illustrates a message system for fault isolation, and sets forth a model based method for fault isolation by introducing an extra layer 210, 220, 230 between the operator or means for operating and the actual error messages 200 produced by the control system 110. The approach can be summarized as having a liberal error message sending policy for individual objects, with a structured signature for the messages, and a clustering 210 method to isolate (fault) scenarios. A model 220 of the system is then used to isolate the object/objects closest to the fault in each fault scenario (cluster 1 and cluster 2 in FIG. 2). The message(s) closest to the fault (Primary fault message 1 and Primary fault message 2 in FIG. 2) and hence most relevant, can then be presented to an operator or means for operating.

A basic terminology is now established:

Definition: Control System Log

The system log 200 constitutes a list of events recorded by the system in chronological order in the form of messages.

Eventually the terms event and message are used interchangeably.

Definition: Fault

A fault is a run-time change or event, often in hardware 100 that eventually causes the system to deviate from normal operation.

Definition: Error Message

An error message is a message sent by an individual software object to the operator, as response to a detection of an error condition for that object.

The kind of error condition that can arise in an object is closely related to the refinements of the error message, which is further discussed below Definition: Fault Scenario A fault scenario consists of all instantiated system entities and events involved in the origin and manifestation of a specific fault.

Examples of system entities are objects, links, threads, hardware equipment and physical connections.

The system log may contain messages belonging to several different fault scenarios. In order to perform analysis of a single fault scenario, messages that have occurred during the same fault scenario are clustered 200, 210 together according to the present invention. A time period is formed to frame from a plurality of error messages the error messages belonging to a fault scenario of the fault.

A clustering 210 method for clustering the error messages that fall within the time period according to the present invention is based on maximal time span of a cluster here called cluster period framed divider events. A divider event indicates that a new cluster begins with this event even if the time period is valid. Each cluster is identified and passed on for analysis 230. An example of a basic clustering algorithm is found below.

The Clustering Algorithm Pseudo Code:

```
Name: ClusterLog
Input: A system log
Output: A stream of clusters
WHILE new event exist OR time out/end of file DO
  IF event exist THEN
    IF event in divider group THEN
      Analyze current cluster.
      Create new cluster and add current event.
    ELSE
      IF cluster exists THEN
        IF current event (time) – start event (time)
        <Cluster period
        THEN
          Add current event to cluster
        ELSE
          Analyze current cluster.
          Create new cluster and add current event.
      ELSE
        Create new cluster and add current event.
  ELSE
    Analyze current cluster.
```

Design parameters for clustering are events in a divider group and the length of a cluster period. An adaptive scheme could be considered with, e.g., increasingly larger (or smaller) cluster periods or concatenation of clusters.

To use a specific explanation model 220 on a fault scenario, it is necessary to know how the error messages in the log relate to the chosen explanation base (s). The general semantics of this relationship, induced by the demands of an OO architecture (Object Oriented, OO), is that an error message is a complaint from an (instantiated) entity about an (instantiated) entity. The complainee entity might be the same as the complaining entity (internal error), or the complainee might be unknown for OO architecture reasons. The two entities need in general not be of the same kind, e.g., an object might complain on a thread. An error message signature is complainer and complainee information for an error message. An error message signature is present in error messages, including information of a sending source object and thread, and if possible, the reason for the error message in form of information on which system entity that failed to perform a requested service.

An error message signature is complainer and complainee information for an error message.

An error message signature is present in error messages, comprising information of a sending source object and thread, and if possible, the reason for the error message in form of information on which system entity that failed to perform a requested service.

An error message signature for objects as explanation base is detailed below.

An ordinary method call to another object that returns with an error code is the most common example of an error condition that should result in a relational error message with known complainee. The complainee may be unknown when the responsible object is not known to the complainer for encapsulation or modularity reasons.

A corresponding error condition could be a detected error in hardware or external equipment which the object encapsulates knowledge of.

Figure 3:
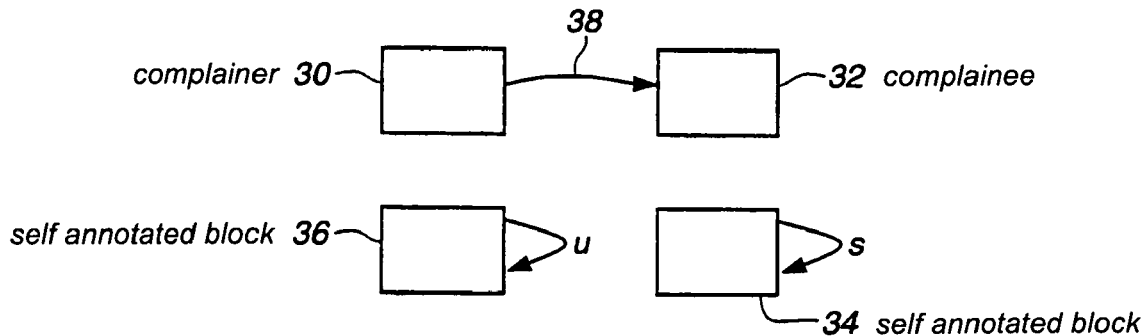
FIG. 3 schematically illustrates graphical notations for different error messages in accordance with an embodiment of the invention.

A graphical notation for the different error message types is introduced and depicted in FIG. 3. Boxes or blocks 30, 32, 34, 36 represent objects. A relational error message with known complainee is denoted with an arrow 38 between the complainer 30 and the complainee 32. A specific error message uses an arrow to self annotated block 34 with the letter "s". A relational error message with unknown complainee also uses an arrow to self annotated block 36 with the letter "u". It should be noted that the two types of arrows to self are semantically different. The relational error message with unknown complainee could for example be more suggestively drawn as an arrow ending in a question mark. The notation is chosen for simplicity reasons.

The information obtainable from error messages adhering to OO design rules are not always enough to form a complete and coherent overview picture of a fault scenario. To complement the error messages, a system model 220 is used, that contains information on how system entities, such as software entities, depend on each other to perform its tasks. The model 220 reflects the current system design.

An explanation model is the underlying assumptions needed when using a specific type of system entity as the base for fault isolation. System entity types that can be used as base for explanation models are, e.g., objects, packages and threads (tasks). A main idea is to use the structure of the system, manifested in entities as mentioned, to establish cause-consequence relationships between error messages. Examples of model structures are UML class diagrams, object diagrams and task diagrams, Object Management Group. UML Notation Guide, version 1.1. doc no ad/97-08-05, September 1997.

A system entity often has a certain type, from which several individuals can be instantiated, as for class—object and thread type—thread instance. Error messages of course come from instantiated entities. The system model though, does not need to contain information on instances, but only on types, as for example UML class diagrams. Using the model to "guess" probable dependencies between instances would make such an analysis less reliable. This fact can be used to estimate the reliability of the analysis. A main goal is a cause-consequence relationship between all error messages in a fault scenario, preferably with one unique root cause error message. This is a first measure of reliability.

A design parameter for the analysis is the search depth to use in the model, i.e., how many "silent" entities are to be assumed part of the fault scenario. Another design parameter is priority based addition of cause-consequence relationships using the system model. The priority can be based on properties of the instantiated entities or properties assigned to entities in the model.

For the sake of simplicity in the following presentation, an algorithm is detailed below for the specific explanation model that uses only objects as base. The explanation model is, in short, that the problems an object experiences, reported for example by error messages, can be explained by the objects dependence on other objects and the knowledge and resources they administer. This is a suitable assumption when the interest is mainly in hardware induced faults. A more complete explanation model would, e.g., use both objects and threads as explanation base, and hence also take dependencies between concurrent threads in account.

Figure 4:
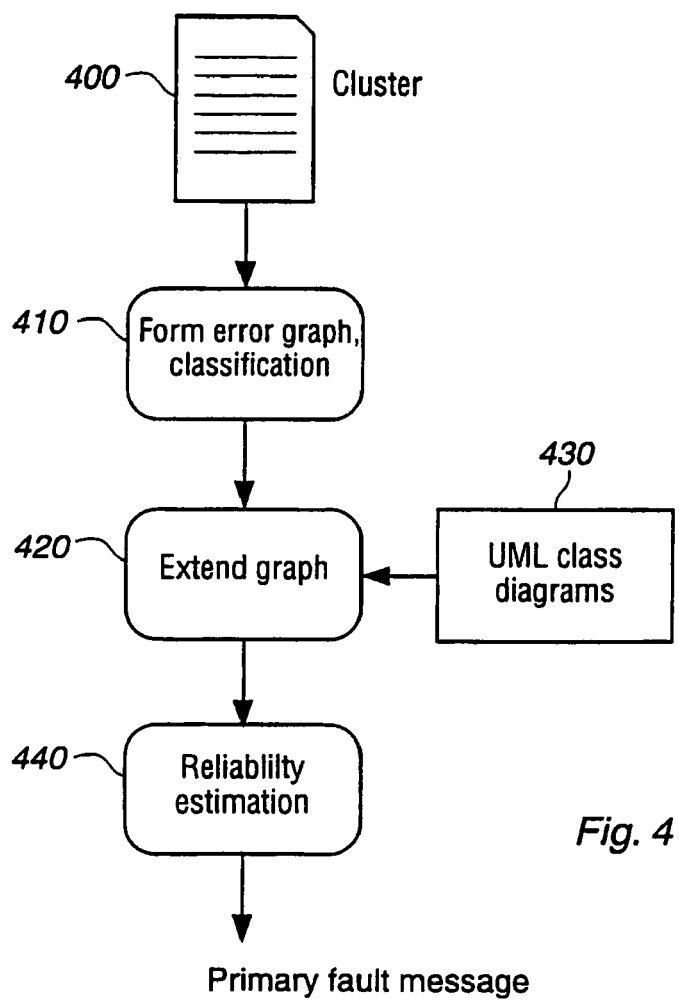
FIG. 4 schematically illustrates a flow chart over an analysis procedure in accordance with the present invention.

An analysis can be broken down into three main steps as schematically illustrated in FIG. 4 through a flow chart over an analysis procedure in accordance with the present invention.

The forming of a rudimentary partial order directly from the clustered 400 error messages can be accomplished given the message signature. It can be represented as a directed graph, which henceforth will be called the error message graph, base message graph 410 or base graph.

An error message graph can possibly be modified by a graph extension 420. All added edges will be relational, since a goal with graph extensions 420 is to make the graph connected. The edges between objects, both from the log and derived, should be read as "complaint about". A formed base graph consists of system entities describing how they depend on each other in a current fault scenario. The base graph is constructed using information in an error message signature.

The purpose of graph extensions 420 is to make the base graph connected and acyclic, with a unique root node. A base graph is used to isolate a probable primary fault, using the semantics provided by a suitable explanation model 220.

Objects in the graph are classified in terms of their error messages, or rather the edges they are connected to. Since there are three kinds of error messages (or edges), two involving one object and one involving two objects, there are four independent ways an object can be connected to an edge. The objects in a base graph will be classified according to this, as described below. It also provides a chosen notation for the object properties.

Node (Object) Classification and Notation.

| | |
|---|---|
| U | Is complainer, unknown complainee |
| Cr | Is complainer, known complainee |
| Ce | Is complainee |
| S | Has specific error message |

Figure 5:
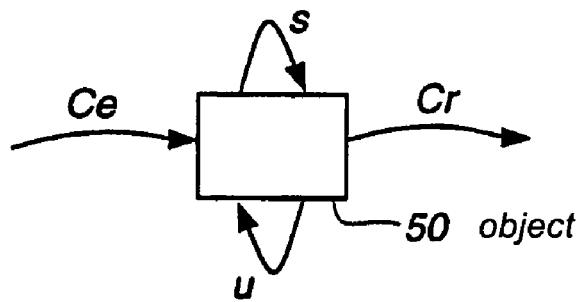
FIG. 5 schematically illustrates four possible properties of a base graph node in accordance with the present invention.

Each object in a base graph can of course have any combination of these properties and, in analogy with the bitwise or-operator in C and C++, the combination of properties will be denoted, for example, as S. This expression denotes a complainee with a specific error message, which would make it a good candidate for being close to the real fault. See FIG. 5, which schematically illustrates four possible properties of a base graph node in accordance with the present invention, for an object 50 with classification U. If the number of edges of a specific type which an object is connected to is not taken into account, the total number of possible object classifications is 15.

The strategy employed becomes straight forward, and a special case chose the nodes in the base graph that do not have a complainee or a specific error message, i.e., no one to "blame", use the model to find possible complainees already in the base graph, and extend the graph accordingly.

With such a strategy in mind, the 15 object classifications are divided into three main groups. (The classifications from the two first groups are named well formed, in contrast to the classifications from the last group.)

Three Node (Object) Classification Groups.

| | |
|---|---|
| Needs complainee: | U, U\|Ce and Ce |
| OK as it is: | S, S\|Ce, Cr, U\|Cr, U\|Ce\|Cr and Ce\|Cr |
| Undesired cases: | U\|S, S\|Cr, U\|S\|Ce, U\|S\|Cr, S\|Ce\|Cr |
| (Probably bad design) | or U\|S\|Ce\|Cr |

A pseudo code for a possible "ExtendGraph" algorithm and for the whole graph becomes as below. The graph extension for an individual object has here been located in a below subroutine called extendGraph.

The ExtendGraph Algorithm

```
Name: ExtendGraph
Input:   An error graph
         A UML model
Output: An extended (or unchanged) error graph
ExtendGraph(REF Graph) {
for (all objects in Graph)
   if (object type is U, U|Ce or Ce)
     call extendGraph(object)
   if (object type is S, S|Ce, Cr, U|Cr, U|Ce|Cr or Ce|Cr)
     do nothing
   if (object type is U|S, S|Cr, U|S|Ce, U|S|Cr, S|Ce|Cr or U|S|Ce|Cr)
     issue warning
}
```

The graph extension for an individual object has here been located in a below soubroutine named extendGraph.

The extendGraph Pseudocode

```
Name: ExtendGraph
Input: A base graph
       A UML model
Output: An extended (or unchanged) base graph
ExtendGraph(REF Graph) {
for (all objects in Graph)
   if (object type is U, U|Ce or Ce)
     call extendGraph(object)
   if (object type is S, S|Ce, Cr, U|Cr, U|Ce|Cr or Ce|Cr)
     do nothing
   if (object type is U|S, S|Cr, U|S|Ce, U|S|Cr, S|Ce|Cr or U|S|Ce|Cr)
     issue warning
}
```

When it is decided to extend the graph for a specific object, the UML model, see 430 in FIG. 4, is used to enumerate all possible servers of that object. The object for which complainees are searched will be named the original search object. The class corresponding to the original search object will be named the original search class.

If there is an object already in the base graph that corresponds to the found server class, this information is used to "guess" that this is a valid connection in the current fault scenario, and extend the graph. Since the search relies on association information, in contrast to instantiated links, and the found servers are of course only classes, it is not known for certain if an object corresponding to the class is active in the current fault scenario.

The search in the UML model 430 provides a chain of classes connected by navigable associations, where the first class is always the original search class or a subclass of the original search class. Such a chain is called a server chain. A server chain is schematically illustrated in FIG. 6 as a generic example of a UML traversal algorithm.

The extension of the graph consists of creating nodes 60 and edges 62 corresponding to the classes and associations in the server chain. Pseudo code for the algorithm is presented above. The enumeration of servers using the UML model is performed in a breadth first fashion and is described in detail below.

Since the software model might be very large, and since it is not to rely to heavily on static class information, the search depth in the server enumeration can be limited. The search depth is the number of associations used, to get from the original class to the last server in the server chain.

If the first requirement that the graph is connected and acyclic is fulfilled, then a measure of reliability 440 could be $$\frac{N_{original\ edges}}{N_{added\ edges} + N_{original\ edges}}$$

which is 1 if no edges 62 needed to be added.

The extendGraph algorithm can be improved by introducing a priority on the objects in the graph if there are several objects that could serve as a complainee for the original search object. A natural priority is to first consider nodes with classification from the "OK as is"-group as derived complainees. If that fails, nodes are considered with classification from the "Needs complainee"-group. This strategy requires either two traversals of the UML model, or a temporary storage of server chains with their last element corresponding to "Needs complainee" nodes.

Because superclasses of the searched servers, both the original and the others, are not returned, it has to be checked not only if the returned servers themselves are in the graph, but also if there is a superclass of the returned server already in the graph. The reason for this inconvenience is that it is desirable to avoid adding a superclass of a server to keep the graph as specific as possible, but if the superclass is already present due to error messages or other graph extensions, it should be used when extending.

A class for which servers are sought, will be called a search class, and the class for which the search started is called the original search class.

A server chain is a class chain consisting of classes connected by navigable associations in the UML model. The first class is always the original search class or a subclass of the original search class. The search depth of the search chain is defined as the number of associations used to get from the original search class to the last server in the chain. This notion of closeness of classes will sometimes be referred to as the association norm, even though it of course strictly speaking is not a norm.

Since the algorithm returns a stream of server chains, it is defined in two parts, GetFirstServer and GetNextServer. Pseudo code for the two parts are presented below.

The UML Traversal Algorithm Pseudo Code

```
Name: GetFirstServer}, GetNextServer
Input A class (the original search class)
   Maximal search depth
   An UML model
Output: A stream of server chains
Returns: OK, FINISHED or ABORTED
State variables (common to GetFirstServer and GetNextServer):
CurrentChain      // The server chain currently being extended
CurrentClass      // The class currently searched for servers
Queue             // Holds the server chains that should be further extended
CurrentAssociationList  // The UML associations of the of the current
   class
Superclass        // Superclass of the last returned server
SubclassQueue     // Subclasses of the last returned server
GetFirstServer(className, REF ServerChain) {
   clear all state variables
   set tmpClass = the class corresponding to className
   if (no class OR several classes found)
      error;
   put tmpClass in tmpChain // One single element
```

-continued

```
   enqueue tmpChain in Queue
   For (all subclasses of tmpClass) // To any depth
      empty tmpChain
      put the subclass in tmpChain
      enqueue tmpChain in Queue
   return GetNextServer(ServerChain)
GetNextServer(REF ServerChain) {
   // If there are any server subclasses previously found, return one of them
   if (SubclassQueue nonempty)
      set tmpClass = dequeue SubclassQueue
      for (subclasses of tmpClass)
         enqueue subclass in SubclassQueue
      set tmpChain = CurrentChain
      add tmpClass to tmpChain
      set ServerChain = tmpChain
      if (not to deep), enqueue ServerChain in Queue
      return OK
   if (CurrentAssociationList empty)
      if (Superclass != NULL)
         set CurrentClass = Superclass // N.B. CurrentClassChain same as before.
         set Superclass NULL
      else // Get a new class (chain) from the queue
         if (Queue empty), return FINISHED
         set CurrentClassChain = dequeue Queue
         set CurrentClass = last element in CurrentChain
      if (superclass of CurrentClass exist AND
         CurrentClass was not enqueued as a subclass of server)
         Superclass = superclass of CurrentClass // Multiple inheritance
            not allowed.
      set CurrentAssociationList = all associations of CurrentClass
   // We have a valid association collection to search for servers
   if (CurrentAssociationList not empty)
      tmpAssociation = pop CurrentAssociationList
      set tmpClass to the associated class of CurrentClass
      if (tmpClass is a server or CurrentClass AND
         tmpClass not equal to the second to last class in CurrentClassChain)
         set tmpChain = CurrentChain
         add tmpClass to tmpChain
         set ServerChain = tmpChain
         for (subclasses of tmpClass) // Only first level inheritance
            enqueue subclass in SubclassQueue
         if (not to deep), enqueue ServerChain in Queue
         return OK
   return GetNextServer(ServerChain) // CurrentAssociationList empty
```

FIG. 6 illustrates a traversal order of the UML model when searching for possible complainees for an original search class named "red".

An example is shown in FIG. 6, with a quite complicated class and all server chains produced by the algorithm for the original search class "red" in Table 1. The search depth used is 2. The numbering of the classes have the semantics <search depth>.<running number>.

Both super- and subclasses of the original search class are searched for servers, see classes 1.6 respectively 1.7 and 1.8 in Table 1. Superclasses need to be searched because the associations are inherited, and subclasses need to be searched since the error message or graph extension that introduced the original search class might have pointed out a superclass of the class actually active in the fault scenario under consideration.

All subclasses of a possible server are enumerated as possible servers in their own right, see 1.3 to 1.5 in Table 1. In these server chains, only the subclass and not the original server is present, since the association leading to a parent is considered inherited.

Superclasses of a server are not returned, since the association leading to the server specifically excludes the superclass. For example, the classes "redSup" and "B1" in Table 1 are not returned. Servers of the superclasses are returned, though, since that association is inherited. In the server chain, it is chosen not to include the superclass itself since the association is considered inherited.

In a preferred embodiment of the system of the present invention it is intended for isolating a fault from a plurality of error messages in a system log 200 of a process controlled by an object oriented program 110. Each error message of the plurality of error messages includes a predesigned signature, and an interface is located between the program and a process control. Whereby the interface includes elements for clustering 210 error messages belonging to a fault scenario of the fault. Also, means for forming from the signatures of the clustered 210 error messages a formal representation, a base graph 410, of the fault scenario. Further it includes elements for analyzing 230 the formal representation to isolate the fault, and elements for reporting information containing the fault to the process control, which provides measures taking care of the fault.

Hence, the process control is able to maintain, repair, diagnose etc. the detected fault in a much quicker way than known through prior art.

A signature includes information on complaint, complainer and complainee, and the signature is formed from an explanation model comprising an underlying assumption of communication between system entities needed to carry out a specific task. System entities include objects 60, packages and threads.

Regarding the time period it starts with the first error message in the fault scenario and ends with a stop message in one embodiment of the present invention.

Further in an embodiment of the invention the system includes elements for establishing a reliability estimate 440 of the fault and that the fault information contains the estimate.

If the base graph 410 is inconclusive, the system further includes, in one embodiment of the invention, elements for extending it by providing a system model 220, containing information on dependency relations between system entities, and elements for isolating the fault from the extended graph 420 by using predetermined explanation rules.

In one embodiment of the system according to the present invention it is used in a process involving an industrial robot.

Another embodiment of the present invention provides a computer program code element includes computer code for enabling a processor to isolate a fault from a plurality of error messages in a system log 200 of a process controlled by an object oriented program 110. Thereby enabling a processor to carry out the steps of;

forming an interface between the program 110 producing the plurality of error messages and a process control, creating a cluster 210 from the plurality of error messages belonging to a fault scenario of the fault, analyzing the cluster 400 using predefined error message signatures and a predetermined system model 220 to isolate the fault, and reporting information containing the isolated fault to the process control, which provides measures taking care of the fault. The code element is in one embodiment of the present invention contained in a computer readable medium.

Further, the code element is supplied at least in part over a network such as the Internet in an embodiment of the present invention.

In another embodiment of the present invention, a computer readable medium is provided, containing a computer program code element including computer code for enabling a processor to isolate a fault from a plurality of error messages in a system log 200 of a process controlled by an object oriented program 110. Whereby the processor is enabled to carry out the steps of:

forming an interface between the program producing the plurality of error messages and a process control, creating a cluster 210, 400 from the plurality of error messages belonging to a fault scenario of the fault, analyzing 230 the cluster 400 using predefined error message signatures and a predetermined system model 220 to isolate the fault, and reporting information containing the isolated fault to the process control, which provides measures taking care of the fault.

Also, the system according to the present invention is able to conduct features as described above in a method.

Elements used in the interface are, for example, software and software drivers, any kind of suitable display etc. and other elements known to a person skilled in the art.

It is thus believed that the operation and the embodiments of the present invention will be apparent, for a person skilled in the art, from the foregoing description. While the method and interface shown or described has been meant as being preferred it will be obvious that various changes and modifications may be made therein without departing from the spirit and scope of the present invention as defined in the attached claims.

TABLE I

| | |
|---|---|
| 1.1 red | A1 |
| 1.2 red | BB1 |
| 1.3 red | F1 |
| 1.4 red | E1 |
| 1.5 red | FF1 |
| 1.6 red | D1 |
| 1.7 redSub | C1 |
| 1.8 redSubsub | A2 |
| 2.1 red | A1–A2 |
| 2.2 red | BB1–BB2 |
| 2.3 red | BB1–B2 |
| 2.4 red | E1–E2 |

The invention claimed is:

1. A method for isolating a fault from a plurality of error messages in a system log of a process controlled by an object oriented program, the method comprising:

creating a plurality of predefined signatures comprising a predefined signature for each error message of said plurality of error messages;

forming a time period to frame from said plurality of error messages the error messages belonging to a fault scenario of said fault;

clustering said error messages that fall within said time period;

forming from said predefined signatures of said clustered error messages a base graph, which is a formal representation of said fault scenario, carrying cause-effect relation information of said clustered error messages;

forming an explanation model from an underlying assumption of communication between system entities needed to carry out a specific task, the system entities comprising objects, packages and threads, and having said predefined signatures defined on a base of said explanation model;

analyzing said base graph to isolate said fault; and reporting information concerning said fault.

2. The method according to claim 1, wherein each of said signatures is brought to contain information on a complaint and a complainer.

3. The method according to claim 1, wherein said reported information comprises a reliability estimate of said fault.

4. The method according to claim 1, wherein the information concerning the fault is reported to a control means, which provides measures for resolving the fault.

5. The method according to claim 1, wherein the process comprises operation of an industrial robot.

6. A method for isolating a fault from a plurality of error messages in a system log of a process controlled by an object oriented program, the method comprising:
   creating a plurality of predefined signatures comprising a predefined signature for each error message of said plurality of error messages;
   forming a time period to frame from said plurality of error messages the error messages belonging to a fault scenario of said fault, wherein said time period starts with the first error message in said fault scenario and ends with a stop message;
   clustering said error messages that fall within said time period;
   forming from said predefined signatures of said clustered error messages a base graph, which is a formal representation of said fault scenario, carrying cause-effect relation information of said clustered error messages;
   analyzing said base graph to isolate said fault; and
   reporting information concerning said fault.

7. A method for isolating a fault from a plurality of error messages in a system log of a process controlled by an object oriented program the method comprising:
   creating a plurality of predefined signatures comprising a predefined signature for each error message of said plurality of error messages;
   forming a time period to frame from said plurality of error messages the error messages belonging to a fault scenario of said fault;
   clustering said error messages that fall within said time period;
   forming from said predefined signatures of said clustered error messages a base graph, which is a formal representation of said fault scenario, carrying cause-effect relation information of said clustered error messages;
   analyzing said base graph to isolate said fault, wherein if the base graph is inconclusive said analyzing further comprises extending said base graph with the help of a system model including information on the dependency relation between system entities, and analyzing said extended base graph with a set of predetermined explanation rules to isolate said fault; and
   reporting information concerning said fault.

8. A system for isolating a fault from a plurality of error messages in a system log of a process controlled by an object oriented program, the system comprising:
   a plurality of predefined signatures comprising a predefined signature for each error message of said plurality of error messages, wherein said predefined signatures comprise information on complaint, complainer and complainee, and wherein said predefined signatures are formed from an explanation model comprising an underlying assumption of communication between system entities needed to carry out a specific task, said system entities comprise objects, packages and threads; and
   an interface located between the object oriented program and a means for process control, said interface comprising
      means for clustering error messages belonging to a fault scenario of said fault,
      means for forming from said signature of said clustered error messages a formal representation of said fault scenario,
      means for analyzing said formal representation to isolate said fault, and
      means for reporting information concerning said fault.

9. The system according to claim 8, wherein said means for reporting reports the information concerning the fault to said means for process control, which provides measures for resolving the fault.

10. The system according to claim 8, wherein said formal representation comprises a base graph.

11. The system according to claim 8, further comprising:
    means for establishing a reliability estimate of said fault, wherein said fault information contains said reliability estimate.

12. The system according to claim 8, wherein the process is carried out by an industrial robot.

13. A system for isolating a fault from a plurality of error messages in a system log of a process controlled by an object oriented program, the system comprising:
    a plurality of predefined signatures comprising a predefined signature for each error message of said plurality of error messages;
    a time period starts with a first of said plurality of error messages in said fault scenario and ends with a stop message; and
    an interface located between the object oriented program and a means for process control, said interface comprising
       means for clustering error messages belonging to a fault scenario of said fault,
       means for forming from said signature of said clustered error messages a formal representation of said fault scenario,
       means for analyzing said formal representation to isolate said fault, and
       means for reporting information concerning said fault.

14. A system for isolating a fault from a plurality of error messages in a system log of a process controlled by an object oriented program, the system comprising:
    a plurality of predefined signatures comprising a predefined signature for each error message of said plurality of error messages; and
    an interface located between the object oriented program and a means for process control, said interface comprising
       means for clustering error messages belonging to a fault scenario of said fault,
       means for forming from said signature of said clustered error messages a formal representation of said fault scenario, wherein said formal representation comprises a base graph,
       means for analyzing said formal representation to isolate said fault, wherein if said base graph is inconclusive the system further comprises means for extending said base graph with the help of a system model containing information on a dependency relation between system entities and means for isolating said fault from said extended base graph by using predetermined explanation rules, and
       means for reporting information concerning said fault.

* * * * *